No. 673,975. Patented May 14, 1901.
F. BURGER.
ACCELERATING BRAKE SYSTEM.
(Application filed Aug. 17, 1898.)
(No Model.) 5 Sheets—Sheet 1.

Fig. 1.

Witnesses Inventor
Franz Burger.
By
Attorneys

No. 673,975. Patented May 14, 1901.
F. BURGER.
ACCELERATING BRAKE SYSTEM.
(Application filed Aug. 17, 1898.)
(No Model.) 5 Sheets—Sheet 2.

Inventor
Franz Burger

No. 673,975. Patented May 14, 1901.
F. BURGER.
ACCELERATING BRAKE SYSTEM.
(Application filed Aug. 17, 1898.)

(No Model.) 5 Sheets—Sheet 4.

No. 673,975. Patented May 14, 1901.
F. BURGER.
ACCELERATING BRAKE SYSTEM.
(Application filed Aug. 17, 1898.)

(No Model.) 5 Sheets—Sheet 5.

Witnesses
J. G. Finkel
James D. Stevens

Inventor
Franz Burger
By Loren Freeman
Attorneys

United States Patent Office.

FRANZ BURGER, OF FORT WAYNE, INDIANA, ASSIGNOR OF THREE-FOURTHS TO HENRY M. WILLIAMS, OF SAME PLACE.

ACCELERATING BRAKE SYSTEM.

SPECIFICATION forming part of Letters Patent No. 673,975, dated May 14, 1901.

Application filed August 17, 1898. Serial No. 688,787. (No model.)

*To all whom it may concern:*

Be it known that I, FRANZ BURGER, a citizen of the United States, residing at Fort Wayne, in the county of Allen and State of Indiana, have invented certain new and useful Improvements in Accelerating Brake Systems, of which the following is a specification.

This invention relates to certain new and useful improvements in combined brakes and car-starters, having for an object to provide simple and effective means whereby the movement of a car or train of cars may be quickly arrested without the use of the ordinary brake-shoes, thereby avoiding the wear upon the truck-wheels incident to the employment of such shoes and insuring even running of the cars.

A further object of the invention is to provide means whereby to assist in starting a car in connection with which it is used, thus relieving the unusual strain imposed upon the engine and motor in starting the car from a standstill.

With these objects in view the invention consists in the novel construction, combination, and arrangement of the parts hereinafter more particularly described.

In the accompanying drawings, forming a part of this specification, and in which like characters of reference designate corresponding parts.

Figure 1:
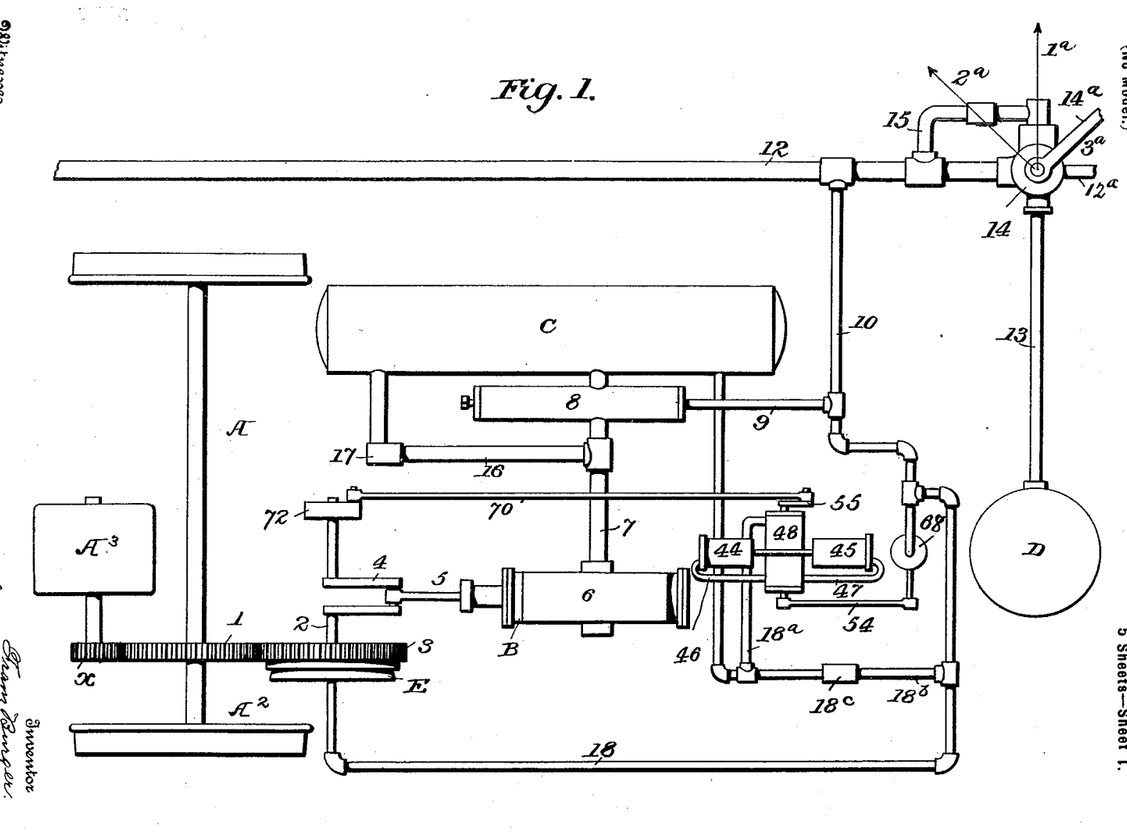
Figure 1 is a diagrammatic view illustrating generally the mode of operation of the invention and arrangement of the parts for carrying it into effect.
Figure 2:
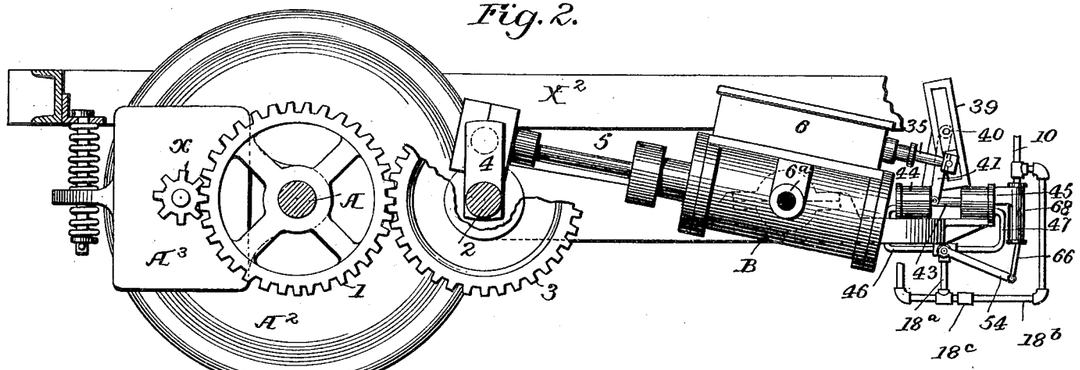
Fig. 2 is a side view of the compressor and motor-cylinder and some of its coöperative parts.
Figure 3:
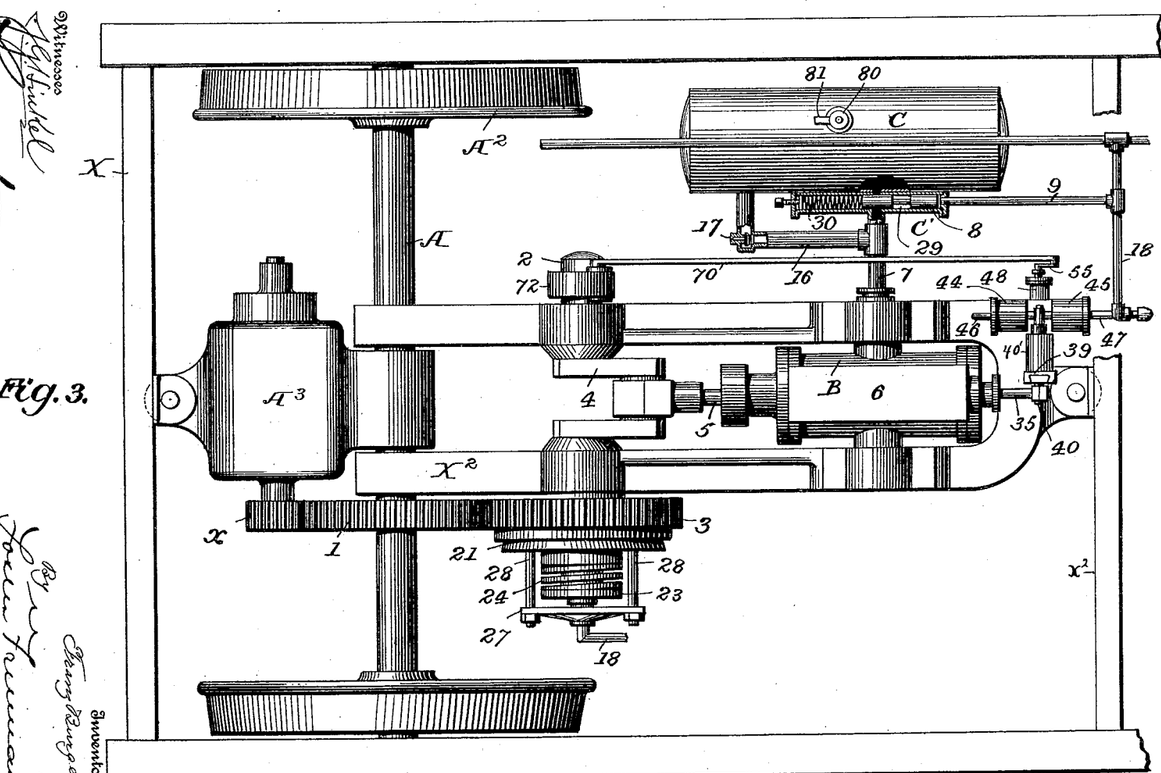
Fig. 3 is a plan view of the apparatus, parts being broken away and in section.

Referring more particularly to Fig. 1 of the drawings, from which the general mode of operation of the invention can best be understood, A designates the rotary axle of two of the traction-wheels of a car, mounted upon which is a gear-wheel 1. Suitably supported adjacent to the axle A is a crank-shaft 2, loosely mounted upon which is a gear 3, intermeshing with the gear 1, and connected to the crank 4 of this shaft is a connecting-rod 5 of the piston of a combined motor and brake or compressor cylinder B, suitably mounted upon the truck of the car. The valve-chest 6 of this cylinder communicates with an auxiliary compressed-air reservoir C through a pipe 7, the passage of which is controlled by a valve 8, adapted to be actuated by compressed air supplied thereto through pipes 9, 10, 12, and 13, communicating with each other and with a main compressed-air reservoir D. Within the pipe 13, in a position easily accessible to the operator, is an ordinary three-way valve 14, and communicating with the valve 14 and pipe 12 is a by-pass 15, in which is arranged an ordinary reducing-valve 15'. Connecting the pipe 7 and the reservoir C is a by-way pipe 16, provided with check-valve 17, opening inwardly to the reservoir. Arranged adjacent to the loose gear 3 is a clutch E for connecting and disconnecting the said gear to the crank-shaft 2 to enable it to move therewith or to rotate independently thereon. This clutch is adapted to be operated by compressed air, which is delivered thereto through a pipe 18, connected with the pipe 10. Within the valve-chest is the usual slide-valve, the stem of which projects through one end of the chest and is connected to suitable devices for imparting the proper movement to the slide-valve. Means is also provided for shifting the actuating devices of the slide-valve to reverse the movement of said valve and the action of the engine B. This means is adapted to be actuated by compressed air supplied thereto at times from the main reservoir D and at other times from the auxiliary reservoir C, as will be hereinafter described. With the parts thus arranged and assuming the car to be at a standstill and it is desired to start it the engineer puts the usual driving-motor into operation and simultaneously shifts the lever 14ᵃ of the valve 14 to the position 1ᵃ, placing the pipes 12 13 into communication through the by-pass 15 and permitting compressed air under reduced pressure to flow through said pipes and the pipes 9 and 10 to the valve 8, which it forces open to place the reservoir C into communication with the engine B through the pipe 7. This has the effect of starting the engine, causing it to rotate its crank-shaft 2 and the gear-wheel 3, the said gear being normally held rigidly upon its shaft by the clutch E. Through the gear-wheel 3 rotary movement is imparted to the gear 1 and the axle A, and this, effecting the rotation of the traction-wheels, assists the driving-engine of the car in starting the same and relieves the engine of the excessive initial strain to which it would otherwise be subjected. When the car has attained the desired momentum, the valve-lever $14^a$ is turned to the position $2^a$, thereby increasing the air-pressure within the pipe 9, leading to the casing of the valve 8, and also increasing the pressure in the pipe leading to the operating devices of the clutch E. This increase of the air-pressure has the effect of closing the communication between the air-reservoir and engine B, thereby arresting the operation of the engine, and simultaneously the clutch-operating devices are actuated to disconnect the gear-wheel 3 from the crank-shaft, and during the continued movement of the car the said gear rotates idly upon its shaft.

Whenever it is desired to bring the car or train to a stop, the valve-lever is turned to the position indicated at $3^a$, which has the effect of shutting off air from the main reservoir D and opening communication between the train-pipe 12 and the exhaust-pipe $12^a$, and this will result in exhausting all the pressure from the pipes 10, 9, 12, and 18, thereby relieving the pressure upon the valve in the casing 8 and also upon the clutch-operating devices and permitting the valve to assume its normal position to close communication between the auxiliary reservoir and engine B and at the same time allowing the clutch to be operated to effect connection between the gear 3 and its shaft 2. When the parts have been brought to this position, during the continued rotation of the axle A rotary movement will be imparted to the gear 3 and crank-axle 2, causing the piston of the engine to be reciprocated in its cylinder. The engine B is therefore converted into an air-compressor, the air from which, as it is compressed, being forced through the pipes 7 and 16 and, forcing open the check-valve in said latter pipe, passes into the reservoir C to replenish the same. It will be obvious from the above that the air as it is compressed within the ends of the engine-cylinder will resist the reciprocation of the engine-piston, and the crank-shaft of said piston being positively geared to the axle A the rotation of said axle will be resisted at the same time, resulting in the retardation of the motion of the car.

From the above description it will be apparent that simple and effective means are provided, which means are at all times under the control of the motorman or engineer, for assisting the usual driving engine or motor of a car or train in starting the same and for also serving to arrest the momentum of the car without the employment of the usual brake-shoes.

It will be obvious that as cars are propelled in the opposite direction a reversal in the operation of the parts must take place in order to make them effective regardless of the direction in which the car is propelled, and in order to accomplish this means are provided which will automatically shift the positions of the parts when the direction of movement of the car is changed.

Having now described the mode of operation of the invention in general, one form of apparatus for carrying it into effect will now be described in detail, reference being had to Figs. 2 to 13, in which X designates the truck of a passenger, street, or other car, A one of the axles thereof, and $A^2$ the traction-wheels carried upon the ends of the axle. The car may be drawn by an ordinary locomotive-engine, or it may be propelled by an electric or other motor carried thereon, in the present embodiment of the invention an electric motor $A^3$ being employed, which is mounted upon the truck X and has its armature provided with a gear $x$, which intermeshes with a gear-wheel 1, fixed upon the axle A. Loosely mounted at one end upon the axle A is a suitably-constructed frame $X^2$ for supporting parts of the apparatus, the said frame being supported at its opposite end upon a cross-beam $x^2$ of the truck-frame. Extending parallel to the axle A, at a point adjacent thereto, and journaled in the frame $X^2$ is a crank-shaft 2, having loosely mounted thereon near one end a gear-wheel 3, which intermeshes with the gear 1 of the axle. In its outer side the gear-wheel 3 is formed with an annular conical bearing-surface 20, to which is adapted the corresponding surface of a piston-clutch member 21, connected to turn with and move longitudinally upon the end of the crank-shaft into and out of engagement with the bearing-surface of the gear-wheel 3 to connect and disconnect it from the said shaft. Normally the clutch member 21 is held into engagement with the gear-wheel 3 by means of a spring 22, interposed between the outer face of said member and a bearing-plate 23, rigidly mounted upon the end of the shaft 2. In its extreme outer end the shaft 2 is formed with a longitudinal piston-chamber 24, into which fits a piston 25, having a longitudinal opening 26 through it, which communicates with the piston-chamber and at its outer end is connected to the compressed-air-supply pipe 18, communicating with the compressed-air reservoir D. The outer end of the piston 25 bears upon a spider 27, adapted to move longitudinally upon an elbow of the supply-pipe and connected by means of screw-rods 28 to the clutch member 21.

In the operation of the above-described parts the spring normally holds the clutch member into engagement with the bearing-surface 20 of the gear 3, so as to cause said gear to turn with the crank-shaft 2, and the tension of this spring is sufficient to prevent the disengagement of the clutch by the pressure of air which is admitted to the pipe 18 through the by-pass pipe 15. (See Fig. 1.) When, however, air is admitted to the pipe 18 under excessive pressure, the piston 25 is forced outwardly within its chamber, simultaneously moving the spider 27, and through the screw-rods 28 withdraws the clutch member 21 from engagement with the gear-wheel 3 against the stress of the spring 22, thereby permitting the said gear-wheel 3 to turn loosely upon the crank-shaft 2.

The cylinder and valve-chest of the engine B are mounted upon trunnions $6^a$, projecting from the opposite sides of the cylinder intermediate its ends and received in journals of the supporting-frame $X^2$, in order that the ends of the cylinder may reciprocate vertically during the rotation of the crank-shaft 2. The trunnions $6^a$ are hollow, and with the channel of one of the trunnions communicates the pipe 7, having a swiveled connection with the trunnion. The channel of this trunnion communicates with a passage $6^b$, leading through the wall of the cylinder to the interior of the valve-chest 6, and also leading from the said valve-chest through the cylinder-wall to the channel of the second trunnion is an exhaust-passage $6^c$. Within the valve-chest is a slide-valve $B^2$, secured to a valve-stem 35 and having its under face formed with a recess 36. Adjacent to the exhaust-passage $6^b$ and leading from points upon opposite sides thereof in close proximity thereto to opposite ends of the engine-cylinder are passages 37 38, which passages are alternately placed into communication with the interior of the valve-chest and with the exhaust-passage by the slide-valve. The means for operating this valve will be presently described.

Within the pipe 7, intermediate the engine B and reservoir C, is a cylindrical valve-casing C', in which is fitted to move longitudinally a piston-valve. This valve is formed centrally with an annular recess 29, which is adapted to be brought into position to permit air to flow from the reservoir to the engine-cylinder. Various means may be employed for actuating the valve; but preferably a spring 30 is interposed between one end of the valve and the end of its casing for moving the valve in one direction to its normally-closed position, while entering the casing at the opposite end thereof is the branch supply-pipe 9, through which air under pressure is introduced from the main reservoir D to the casing C' to move the valve 8 in the opposite direction against the action of the spring 30. The tension of the spring 30 is such that when air is introduced into the pipe 9 through the by-pass 15 the pressure will only be sufficient to shift the valve to the left (see Fig. 3) until its recess is in a position to place the engine B into communication with the reservoir C to operate the said engine and rotate the axle A in the manner hereinbefore set forth. When, however, the valve 14 is opened to allow air under maximum pressure to enter the pipe 9 and valve-casing, the valve will be still further shifted to the left and a solid portion thereof brought into position to close the communication between the reservoir C and engine-cylinder, the engine being thereby thrown out of action altogether, the excessive pressure admitted to the supply-pipe having simultaneously disconnected the clutch member 21 from the gear 3, as above explained.

While various means may be employed for actuating the slide-valve, that which will now be described is simple and effective and is preferred on this account. At its outer end the valve-stem 35 is provided with a roll which enters and is adapted to move longitudinally in the inclined slot of a bar 39 as the engine-cylinder and valve-chest are vertically reciprocated by the rotation of the crank-shaft 2, and by reason of the inclination of the said slot the valve-stem 35 and valve $B^2$ are reciprocated horizontally to properly regulate the communication between the passages 37 38 with the inlet and exhaust ports. A standard or bracket 40' projects upwardly from the frame $X^2$, in the top of which is journaled a short shaft 40. The slotted bar 39 is rigidly mounted upon one end of the bar 40, and to the other end of the shaft is connected an arm 41, the end of which is connected to a rod 43, carrying a piston at each end, which pistons fit respectively within two separated alining open-ended cylinders 44 45, and through the closed ends of these cylinders lead branch air-supply pipes 46 47, extending from opposite sides of a valve-casing 48, near one end thereof, and from near the opposite end of the casing in turn extends a pipe $18^a$, connecting with a pipe $18^b$, leading to the pipe 18. Arranged within the pipe $18^b$, intermediate the pipe 18 and the pipe $18^a$, is a check-valve $18^c$, which permits air to flow from the pipe 18 through the pipe $18^b$, but prevents the reverse flow thereof.

The pipe $18^b$ is extended and communicates with the reservoir C, so that when the air-pressure in the pipe 18 is removed by the engineer to set the brakes, or accidentally, as by the breaking of the train, the pressure from the reservoir will pass through the pipes 46 and 47 and hold the pistons 44 and 45 in their correct positions. The valve $18^c$ will permit the air from the pipe 18 to enter the pipes 46 and 47, but will prevent the air from the reservoir escaping when the pressure in the pipe 18 is reduced.

Formed at diametrically opposite points in the walls of the valve-casing 48 are two channels 50 51, extending longitudinally and connecting one end of the casing with the other. Within opposite ends of the valve-casing 48 are arranged two rotary valves 52 53 for controlling the flow of compressed air through the channels 50 51 from the supply-pipe 18ª to the pipes 46 47, which latter pipes lead to the cylinders 44 45, respectively. Each of the valves 52 53 is provided with a stem which projects centrally through the adjacent end wall of the casing, and upon said stems are fixed arms 54 55. The valve 52 is provided with a chamber which is divided by means of a central longitudinal partition into two spaces 56 57, and in the wall of this valve leading from the space 56 are two separated ports 58 59 and an intermediate elongated port 60, while leading from the space 57 are corresponding separated ports 58ª 59ª and an intermediate elongated port 60ª. In practice the ports 58 59ª of this valve are adapted to register alternately with the end of the branch pipe 46 to place one or the other of the spaces 56 57 into communication with said pipe, while the ports 59 58ª are adapted to register alternately with the end of the branch pipe 47 to place the spaces 56 57 into communication with the said pipe, and the ports 58 58ª are arranged to be brought simultaneously to coincide with the pipes 46 47, while the ports 59ª 59 are adapted to be brought simultaneously into communication with said pipes. The ports 60 60ª are of such a length and so arranged that they will always be in communication with the channels 50 51 of the valve-casing, respectively, regardless of the position to which the valve is shifted. The valve 53 is provided in its side with a channel 63, so arranged as to register with the inlet-pipe 18ª and with either one of the channels 50 51, according to the position of the valve, and through this valve and the said channels communication is established between the pipe 18ª and the spaces 56 57 of the valve 52.

The outer end of the arm 54 is connected with the lower end of a link or piston-rod 66, the upper end of which is pivotally connected to a piston-head 67, within a cylinder 68. The upper end of this piston communicates with the air-supply pipe 10, through which air is admitted into the cylinder for moving the piston, link 66, and arm 54 in one direction. In order to move the piston in the opposite direction to bring it to its normal position during the absence of air-pressure within the cylinder, a spring 69 is interposed between one face of the piston and one end of the cylinder, which spring is arranged to oppose the movement of the piston by air-pressure.

Figure 4:
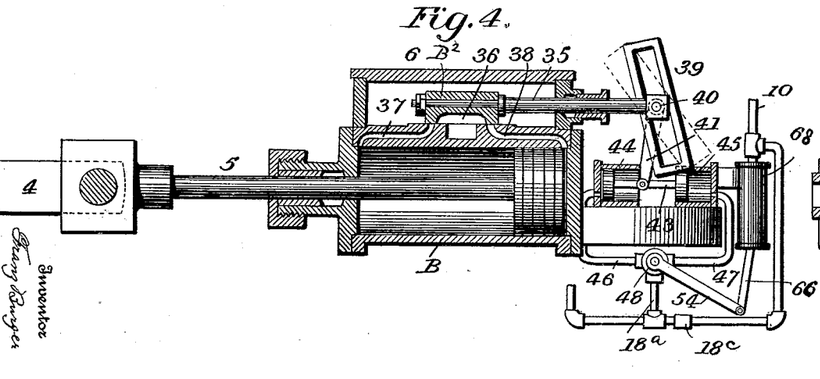
Fig. 4 is a longitudinal sectional view of the motor and compressor.
Figure 5:
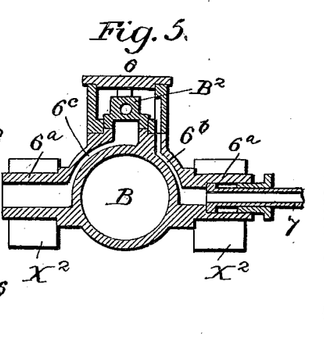
Fig. 5 is a transverse sectional view thereof.
Figure 6:
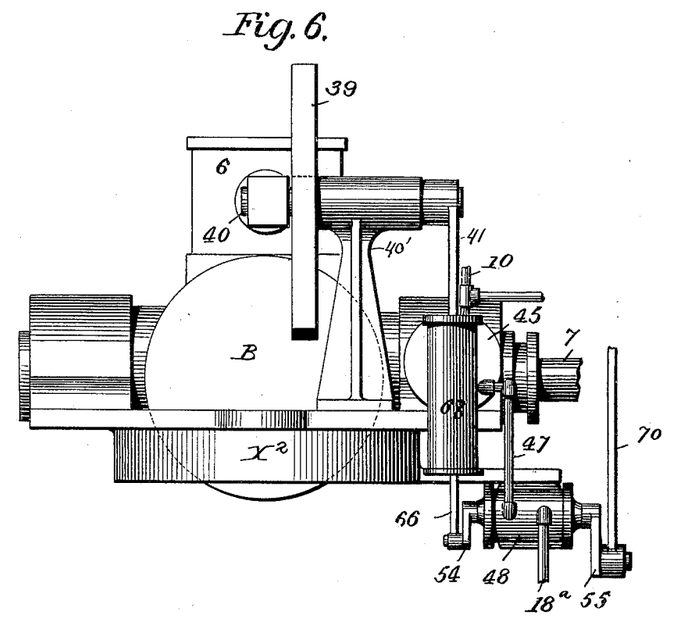
Fig. 6 is a rear elevation of the motor and compressor, parts being broken away.
Figure 7:
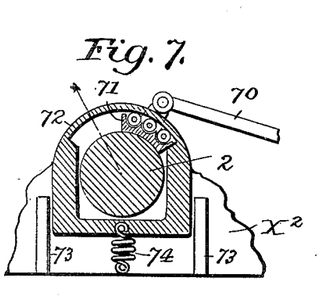
Figs. 7 to 13 are detail sectional views of various parts of an apparatus embodying the invention.
Figure 8:
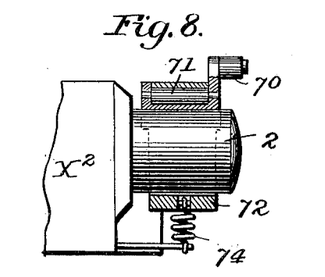
Figure 9:
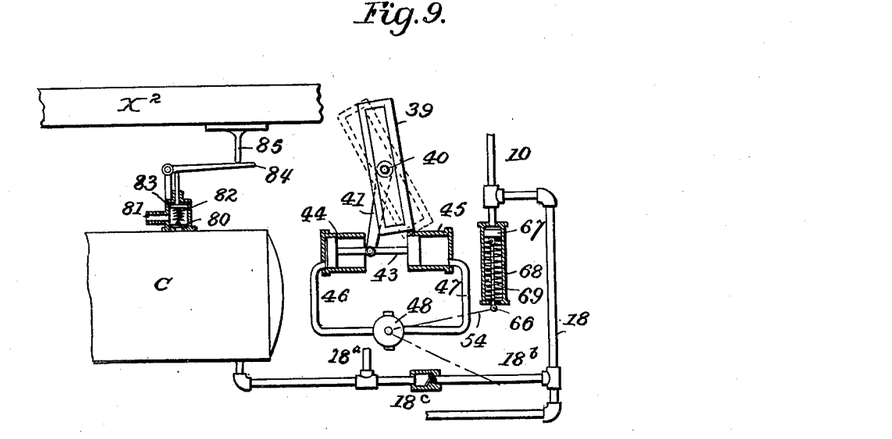
Figure 10:
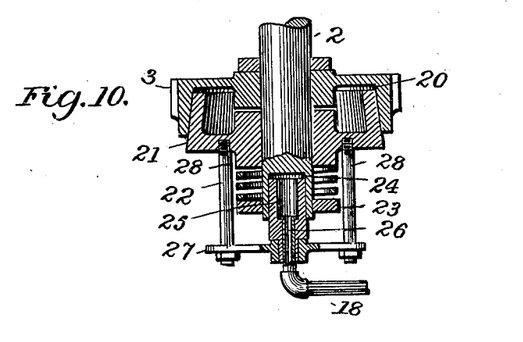
Figures 11, 12:
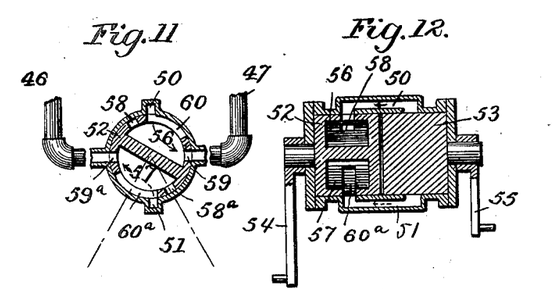
Figure 13:
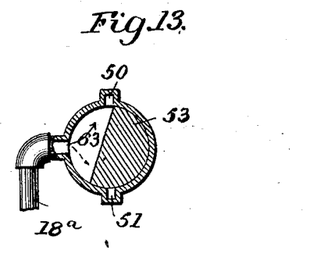

From the above it will be apparent that when air is admitted to the cylinder 68 the piston 67 will be moved to the lower end thereof and through its piston-rod 66 and the link 65 swing the arm 54 to the left, thereby rotating the valve 52 to a position to allow air to pass through the pipe 47 to the cylinder 45, the piston of which is likewise moved to the left to bring the slotted bar 39 to the position shown in full lines, Fig. 4, in which position it will operate the slide-valve B² to permit the air admitted to the valve-chest 6 from the reservoir C through the pipe 7 and passage 6ᵇ to enter the opposite ends of the cylinder B alternately to drive the piston thereof and through the intermediate connection impart movement to the axle A.

If it be desired to change the piston in the cylinder B from a motor to an air-compressor to stop the car, the position of the slotted bar 39 must be changed, so as to reverse the movements of the slide-valve B². To accomplish this, the compressed air must flow through the pipe 46 instead of 47, thereby moving the rod 43 to the right in Fig. 9, which will throw the slotted bar 39 into the position indicated by dotted lines. The air is changed from the pipe 47 to 46 by partially rotating the valve 52, which takes place as soon as the pressure in the pipe 10 decreases sufficiently to permit the spring 69 to expand and carry the piston 67 and link 66 to the upper limit of their movement. As soon as the valve is rotated the air will pass from the pipe 63 through the channel 51 into the space 57 and from there into the pipe 46.

As has hereinbefore been stated, when the direction of movement of a car or engine provided with this improved apparatus is reversed it is necessary to the proper working thereof that the operation of the actuating devices of the valve B² should also be reversed, and in order to effect this automatically a rod 70 connects the end of the arm 55 with a movable segmental block 71, which is held in close conformity with the surface of the crank-shaft 2 by means of a surrounding stirrup 72, provided with the segmental recess in which the block 71 is adapted to be moved. The stirrup 72 is vertically movable in guides 73 of the frame X² and is connected with a spring 74, which holds it in close contact with the block 71, thereby holding the block into firm frictional engagement with the crank-shaft, as clearly shown in Figs. 7 and 8.

From the above it will be apparent that so long as the crank-shaft rotates toward the right the block 71 will be moved by the shaft 2 to the right-hand end of the recess of the stirrup. If, however, the rotation of the crank-shaft is reversed, the block will be moved by reason of its frictional contact with the shaft 2 to the left-hand end of the stirrup-recess. This will cause the rod 70 and arm 55 to be shifted to the left, rotating the valve 53 to a position to direct the flow of compressed air through the pipe 46 to the cylinder 44, causing its piston and, through the intermediate connections, the slotted bar to be shifted to the right, as indicated in dotted lines, Fig. 4, the operation of the slide-valve B² and engine B being thereby reversed.

As considerably more pressure is required to start the engine B when a car is heavily laden than when it is comparatively empty, suitable means are employed for varying the pressure within the reservoir C, accordingly as the weight upon the car is great or small. Different means may be employed for effecting this, that shown comprising a spring-pressed check-valve 80, controlling a port in the top of the cylinder, which port communicates with an escape-pipe 81. This pipe may lead to the exterior atmosphere, as shown, or be disposed of in any desired manner. It will be obvious that the pressure of the air within the reservoir C is regulated by the pressure of the spring 82 upon the check-valve 80, and in order to vary the tension of this spring it bears at one end upon a disk 83, having a stem moving through an opening in the valve-casing and engaging with a pivoted lever 84, one end of which in turn engages with a bearing 85 upon the under side of the car-body. From this it will be apparent that as the car-body sinks under the weight of a load the lever 84 will be depressed, lowering the disk 83 and its stem, and thereby increasing the tension of the spring 82.

While the gear 1 is shown and described as fixed upon an axle of the car, obviously it might be connected to any other suitable movable part. It will be apparent also that when the apparatus is employed in connection with a train of cars a motor B, air-reservoir C, and their connecting devices are carried upon each car of the train, and the pipes 12 of each car in the train are connected together by the usual flexible couplings. It is also to be understood that the main reservoir D will be charged with air to the desired pressure by means of a pump, in the usual manner, and that in a train of cars one reservoir D may be utilized to supply the train-pipes 12 of all the cars.

Without limiting myself to the precise construction and arrangement of the parts shown and described, since it will be obvious that various changes in such construction and arrangement may be made without departing from the spirit or scope of the invention and some features thereof used without others,

What I claim is—

1. The combination with a wheeled vehicle, of a reservoir thereon, a cylinder in communication with the reservoir, a piston in the cylinder detachably connected with a movable part of the car, a main reservoir, and mechanism connected therewith for causing air to pass to or from the first-mentioned cylinder and for controlling the operation of the connection between the piston and said movable part.

2. The combination with a wheeled vehicle, of a reservoir thereon, a cylinder in communication with the reservoir, a piston in the cylinder detachably connected with a movable part of the vehicle, a main reservoir, and mechanism connected with both of said reservoirs for causing air to pass to or from the first-mentioned reservoir and for controlling the operation of the connection between the piston and said movable part.

3. The combination with a wheeled vehicle, of a reservoir thereon, a cylinder in communication with the reservoir, said communication being provided with two valves, a piston in the cylinder connected with a movable part of the vehicle, said connection being provided with a spring-actuated clutch, a main reservoir, and mechanism connected therewith for operating the clutch and one of said valves and for causing air to pass to or from the first-mentioned reservoir.

4. The combination with a wheeled vehicle, of a reservoir thereon, a cylinder in communication with the reservoir, said communication being provided with two valves, one of which is in the form of a piston, the intermediate portion of which is grooved circumferentially, a piston in the cylinder and detachably connected with a movable part of the vehicle, said connection being provided with a spring-actuated clutch, a main reservoir, and mechanism connected therewith for operating the clutch and moving the piston-valve and for causing air to pass to or from the first-mentioned reservoir.

5. The combination with a wheeled vehicle, of a reservoir thereon, a cylinder in communication with the reservoir, a piston in the cylinder detachably connected with a movable part of the vehicle, a valve for controlling the passage of air to or from the reservoir, mechanism for operating said valve, a main reservoir, mechanism connected therewith for controlling the operation of the connection between the piston and said movable part and for holding said valve-operating mechanism in position.

6. The combination with a wheeled vehicle, of a reservoir thereon, a cylinder in communication with the reservoir, a piston in the cylinder detachably connected with a movable part of the vehicle, valve mechanism for controlling the passage of air to or from the reservoir, including two air-receptacles, a main reservoir, mechanism connected therewith for controlling the operation of the connection between the piston and said movable part and for establishing communication between said main reservoir and one or the other of said air-receptacles.

7. The combination with a wheeled vehicle, of a reservoir thereon, a cylinder in communication with the reservoir, a piston in the cylinder detachably connected with a movable part of the vehicle, valve mechanism for controlling the passage of air to or from the reservoir, means for automatically reversing the movement of said valve mechanism, a main reservoir, and mechanism connected therewith for controlling the operation of the connection between the piston and said movable part, and for controlling said valve mechanism in either of its positions.

8. The combination with a wheeled vehicle, of a reservoir thereon, a cylinder in communication with the reservoir, a piston in the cylinder, a crank-shaft connected with the piston and detachably connected with the axle of the vehicle, a reversible block and stirrup mechanism connected with the crank-shaft, valve mechanism for controlling the passage of air to or from the reservoir, including two air-receptacles, a main reservoir in communication with said receptacles, a valve for controlling the passage of air from said reservoir to said receptacles, a rod for connecting said valve with said block and stirrup mechanism, and mechanism connected with said main reservoir for controlling the operation of the connection between the crank-shaft and the car-axle.

9. The combination with a wheeled vehicle, of a reservoir thereon, a cylinder in communication with the reservoir, a piston in the cylinder detachably connected with a movable part of the vehicle, a slide-valve for controlling the passage of air into or out of the cylinder, a compound valve for controlling the operation of the slide-valve, a reversing mechanism for operating one portion of the compound valve, a main reservoir, and means connected therewith for controlling the connection between the piston and said movable part, and for operating the other portion of the compound valve.

10. The combination with a piston, of a slotted bar, a valve for the piston the stem of which is connected with said bar, two cylinders, a piston-rod therebetween, each end of which is provided with a head in one of the cylinders, said rod being connected with said bar, a reversing-valve for controlling the passage of air to either of said cylinders, means for operating said valve, and a reservoir in communication with said cylinders through said reversing-valve.

In testimony whereof I have signed my name to this specification in the presence of two subscribing witnesses.

FRANZ BURGER.

Witnesses:
GEO. K. TORRENCE,
JOHN ZIMMERMANN.